Dec. 27, 1949 C. E. BURKEY 2,492,841
PIVOTED COUNTERBALANCED CAR TOP CARRIER
Filed July 31, 1948 2 Sheets-Sheet 1
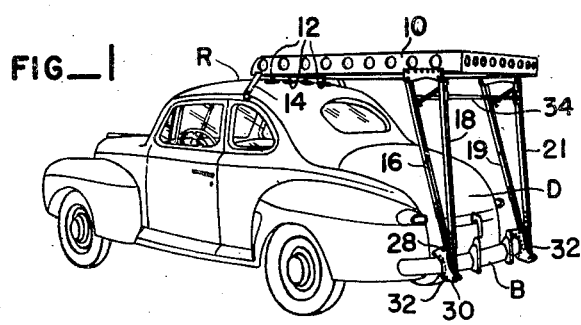
FIG_1
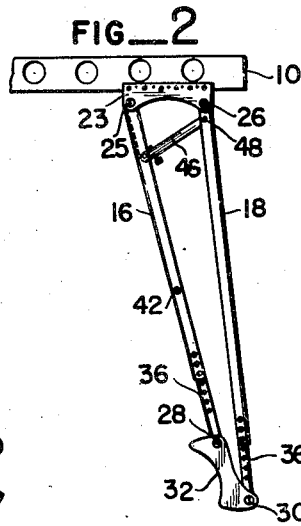
FIG_2
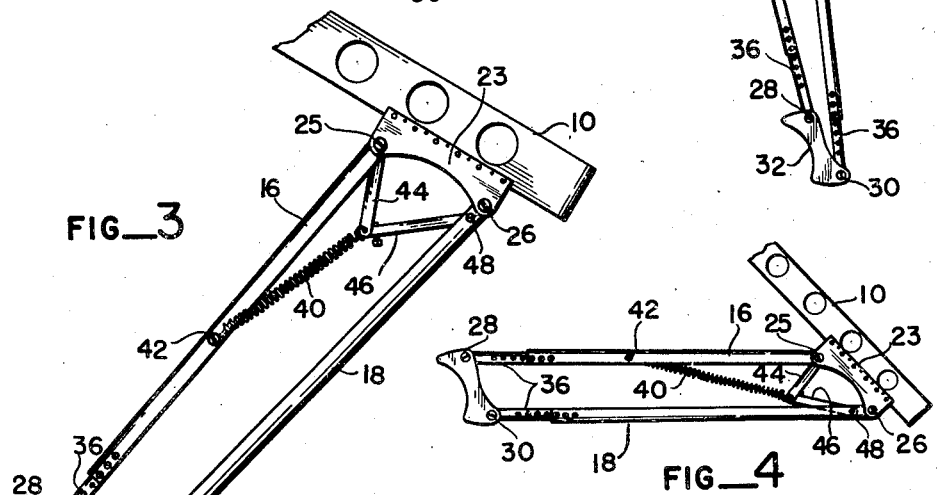
FIG_3  FIG_4
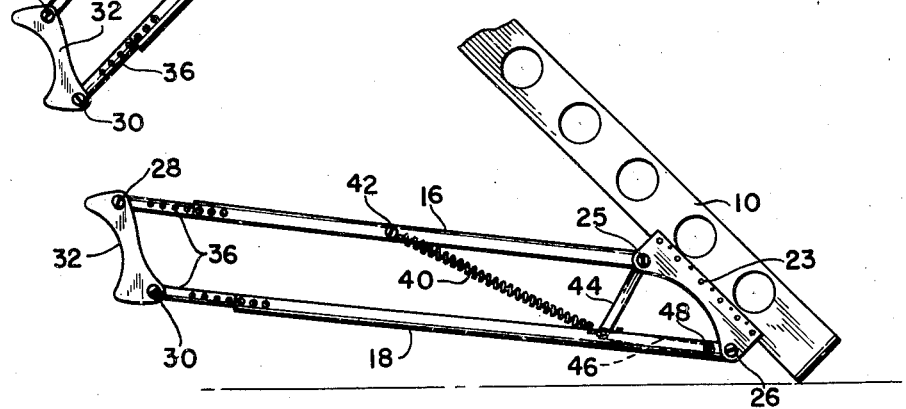
FIG_5
CARL E. BURKEY
Inventor
By Smith & Tuck
Attorneys Dec. 27, 1949     C. E. BURKEY     2,492,841
PIVOTED COUNTERBALANCED CAR TOP CARRIER
Filed July 31, 1948     2 Sheets-Sheet 2
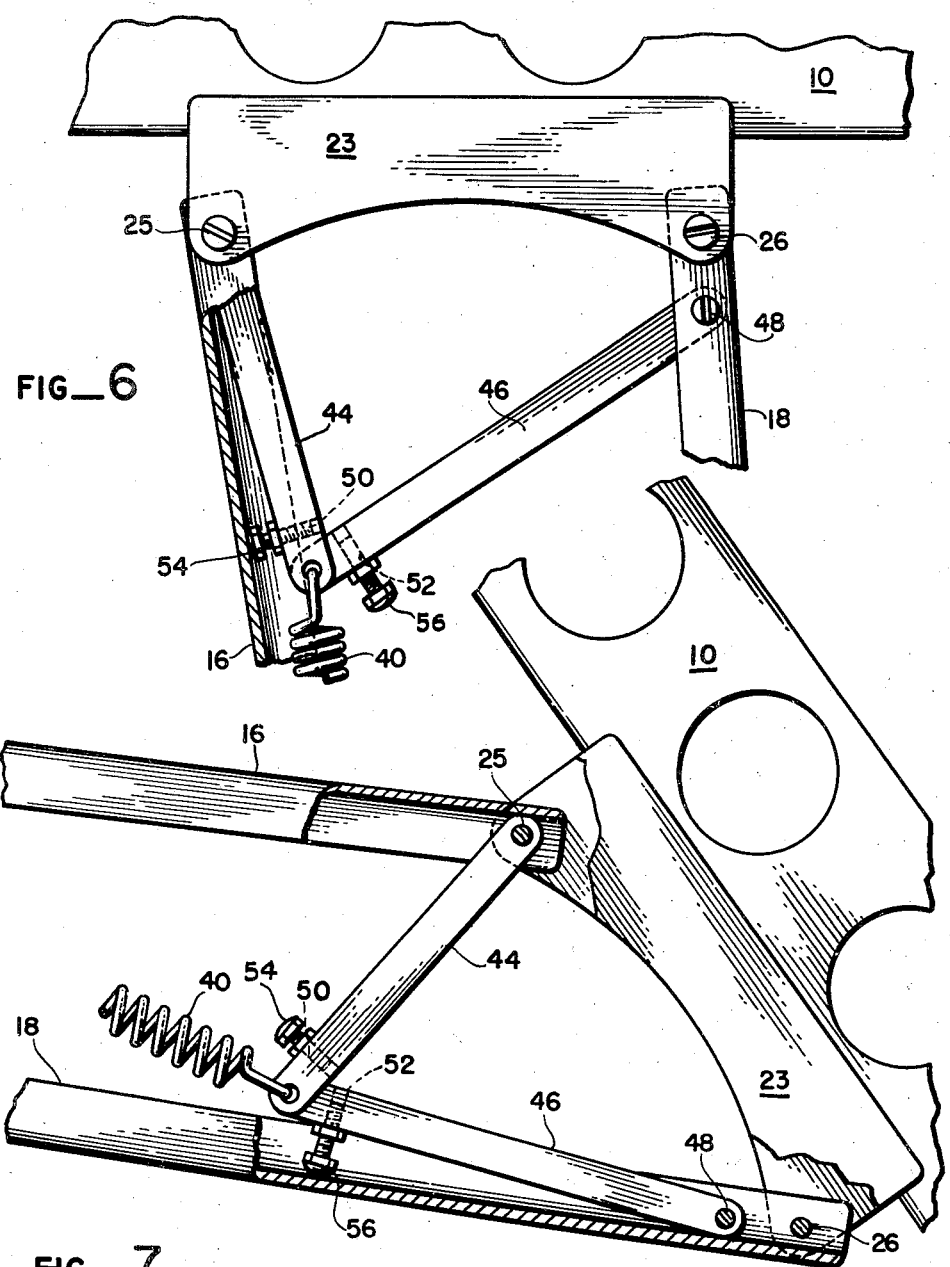
CARL E. BURKEY
Inventor
By *Smith & Tusk*
Attorneys Patented Dec. 27, 1949

2,492,841

UNITED STATES PATENT OFFICE 2,492,841

PIVOTED COUNTERBALANCED CAR TOP CARRIER

Carl E. Burkey, Seattle, Wash.

Application July 31, 1948, Serial No. 41,743

6 Claims. (Cl. 224—42.03)

My present invention relates to the general art of car top carriers and more particularly to the pivoted counter-balanced car top carrier.

My present invention is intended to provide a quickly attached carrier for mounting on the rear bumper of an automobile and which is so constructed so that it can be lowered to a sloping position with one corner resting on the ground for easy loading and unloading. When it is desired to return the carrier so that it rests at one end on the top of the car, a portion of the weight to be lifted will be raised by the counter-balancing spring that was compressed or stretched, according to the placement of the spring, when the carrier is brought to ground level. My present car top carrier has some points in common with my co-pending application, Serial No. 743,809 now Patent No. 2,479,035, dated August 16, 1949. In this present design, however, I have a carrier appreciably simplified from that in my former case, and which embodies certain new and desirable details of structure that enable it to be adapted to a variety of uses.

Of the various car top carriers that have been observed in use, the majority of them have been characterized by being so constructed that they become very much a part of the car and it is not simple or convenient to remove the same from the car during the periods when the carrier is not desired for use. Further, too often the existing carriers have been provided for some definite use, for instance the carrying of skis, the carrying of boats, or the carrying of baggage, and while they serve the purpose of these particular uses they are not of general utility. This is objectionable and in an article that hopes to enjoy widespread sale it is essential that the equipment be adaptable to a wide range of uses so that a prospective buyer can purchase an item that he can use with sufficient frequency to justify the expenditure of the initial purchase, I believe I have overcome many of the deficiencies noted in equipment as at present used, therefore:

The principal object of my invention is to provide a lightweight and easily attached car top carrier that will have a wide range of usefulness.

A further object of my present invention is to provide a car top carrier which will have counter-balancing springs so employed as to greatly assist in raising a load to the top of the car or to assist in lowering it gently to the ground when it is desired to unload or inspect the same.

A further object of my present invention is to provide a car top carrier that admits of sufficient range of adjustment so that it can be readily adjusted to cars of various makes and various styles of bodies in those various makes.

A further object of my invention is to provide a car top carrier in which a plurality of load supporting members are pivoted to an attachment secured to the rear bumper of a car and by proper positioning of the pivot points and associated links, a marked degree of mechanical advantage can be obtained so that the operation of the device is greatly assisted.

Further objects, advantages and capabilities will be apparent from the description and disclosure in the drawings, or may be comprehended or are inherent in the device.

In the drawings:

Figure 1 is a perspective view showing my car top carrier as applied to an automobile and showing the same in its riding or carrying position.

Figure 2 is a fragmentary, elevational view showing the position occupied by my load supporting members when the carrier is in carrying position.

Figure 3 is a fragmentary, elevational view showing the position of my load carrying members when the load carrying platform has been raised from the car top or, similarly, when it is being lowered to the car top.

Figure 4 is a fragmentary view, in elevation, showing the relative position of my load supporting members when they reach a horizontal position.

Figure 5 is a fragmentary side elevation, showing the position of the various parts making up my device when the same is lowered so that the load carrying platform rests on the ground line.

Figure 6 is a fragmentary, elevational view, partly in section, illustrating, in an enlarged view, the essential operational relationships of certain parts of my device when in the load carrying position.

Figure 7 is a fragmentary view, in elevation, and partly in sections, showing the same parts illustrated in Figure 6 but showing them in the relationship they assume when the load carrying platform is down to the ground line level.

Referring more particularly to the disclosure in the drawings, the numeral 10 designates the load carrying platform of my carrier. This may be made in whatever form is best adapted to the range of uses the owner intends for his equipment. It has been found, however, that a box-like arrangement having four lightweight sides and a substantial bottom lends itself best to a wide range of uses. It can be used to carry a boat, carry lumber, carry skis, to carry baggage, or it may be used for the transporting of any materials that are not so heavy so as to dangerously raise the center of gravity of a car. The front end of platform 10 should engage the roof R of an automobile by means of preferably padded feet 12 so that the load can be distributed over quite a large area on resilient feet that will prevent the marring of a car's finish. On each side it is desirable to provide hold-down devices at 14.

The rear end of platform 10 is supported by two pairs of load carrying struts 16—18 and 19—21. These struts are pivotably secured as to bracket 23 which in turn is fixedly secured to platform 10. The pivot points as 25 and 26 should be spaced apart from each other sufficiently to give sufficient mechanic advantage over platform 10, so that the entire platform and its load can be held in exact position by this structure and this spacing will of necessity have to increase as the designed loads become greater. The general proportions taken in comparison with the automobiles shown has proved to be very workable for such loading as can be properly handled by a single individual.

At their lower ends the strut members 16, 18, 19 and 21 are pivoted as at 28 and 30 to a fixture or clamp 32 which in turn is suitably secured to the rear bumper B of an automobile. The exact form of fixture 32 is unimportant. However, the spacing of pivots 28 and 30 is important in relationship to the pivots 25 and 26, and further the positioning with respect to the automobile, of pivots 28 and 30, also should follow substantially that shown throughout my various views with pivots 28 definitely ahead of pivot 30. If this is not observed there will be interference between the two struts of each pair. This is indicated in Figures 1 and 2. More important, however, than this interference is the effect of the movement of the load supporting platform 10 as the platform is raised and lowered.

It will be noted throughout Figures 1 through 5 that the relationship of the pivots 25, 26, 28 and 30, appeared in certain of the views to establish a parallelogram arrangement. This, however, is not true. The center-to-center spacing of pivots 25 and 26 should be substantially greater than the center distance of 28 and 30 and further the forward struts as 16 and 19 should be appreciably longer than the rear struts 18 and 21. This is due to the requirement that the load carrying platform 10 should be substantially level when in its load carrying position. Yet when the carrier is lowered to the ground the angle the carrier board makes with the ground should be such that baggage and other materials can easily be loaded into the carrier and will stay in place. The angle shown in Figure 5 has been found to be about the maximum where convenient loading can be obtained and still not have the load carrying platform resting upon the rear of the car during this operation.

It will be noted by reference to Figure 1 that the top ends of the struts are secured together by a framework designated generally by the reference character 34. The exact form of this reinforcing is a matter of choice. The one requirement that must be met, however, is that the rear door D of the car, whether it be a six passenger coupe as illustrated or a sedan should not be interfered with when it is desired to open the same. This requirement controls to a degree the positioning of clamps 32 on the bumper B and, of course, any cross tie members making up the assembly of 34 must be sufficiently raised that they will not interfere with either opening of door D or preventing the user from having full access to the compartment beneath the door.

In order to adapt my carrier to a wide variety of cars it has been found necessary to provide the adjustable members 36 in each of the lower strut ends. This adjustment is usually best made by levelling the load carrying platform 10 on the car and then making the adjustment required to distribute the weight equally upon all the strut members.

In order to assist the user in the operation of my equipment when it is desired to raise or lower the same I have provided a tension spring 40, one for each pair of struts. The spring 40 is secured at its lower end as by through bolts 42 which pass through the forward struts 16 and 19. It is believed evident that if adjustment is desired on spring 40 a plurality of holes might be employed so that bolt 42 could be shifted up or down from the general position shown.

At their upper ends the counter-balancing springs 40 are secured to two pivoted members as 44 and 46. Link member 44 is pivotably secured on pivot 25 and the corresponding pivot on the other side of the load carrying frame 10. The rear link 46 is pivoted to struts 18 and 21 at a separate pivot 48 disposed below pivot 26. Both the forward link 44 and the rear link 46 are provided with a hole at the extreme end and through this hole is secured the upper end of spring 40.

Reference is now made to Figures 6 and 7 where it will be noted that arms 44 and 46 are each provided with a through hole as 50 and 52. In these holes are secured, by being threaded into or passed through links 44 or 46 and secured by lock nuts, are the positioning bolts 54 and 56, respectively. These bolts 54 and 56 serve as limit stops in the upper and lower position and their exact adjustment is determined to a large degree by the vertical distance from the point where fixture 32 is attached to bumper and the top of the car or roof R where the front end of the platform carrier rests.

It is found desirable to provide a truss arrangement to prevent relative longitudinal movement between the two struts, as 16 and 18, and to thus prevent tortional strains on clamps 32. The clamps themselves can be made amply strong, but if excess turning effort is applied to them many of the sheet steel bumpers, used on present day cars, can be permanently damaged. To overcome this difficulty links 44 and 46 are proportioned to form trusses which are illustrated in their two extreme positions in Figures 6 and 7.

To accommodate the full range of height adjustment possible through the use of members 36, it is found desirable to use adjustable bolts 54 and 56 which should be so adjusted that with the carrier in the riding position bolts 54 contact struts 16 and 19 and when the carrier is lowered, as shown in Figure 7, bolts 56 should contact struts 18 and 21. In this manner a truss of unusual load carrying capacity is provided in the two extreme positions of the carrier. In the carrying position a minimum of weight rests on the car top and in the lowered position no tortional strain is placed on the car bumper.

It is believed that it will be clearly apparent from the above description and the disclosure in the drawings that the invention comprehends a novel construction of pivoted counter-balanced car top carrier.

Having thus disclosed the invention, I claim:

1. A car top carrier, consisting of: a load carrying platform adapted to be supported at its front end by an automobile body top; pairs of struts adapted to entirely support the rear end of said platform and partially support the front end of said platform; fixtures adapted to be secured to the rear bumper of an automobile and provide spaced pivots for the struts of a pair, said pivots being disposed with the pivot of the forward strut above and forward of the pivot of the rear strut; pivots for the upper ends of the struts of a pair, secured to and substantially equi-spaced from the plane of said platform and having a greater center-to-center distance than the said pivots for the lower end of said strut; a forward link and a rear link pivoted to the upper ends of said struts and having their free ends meeting intermediate said struts of a pair; counter-balancing springs pivoted at one end to the forward strut of each pair and at their opposite ends operatively connected to the free ends of said links; and said forward links adapted to have their free ends contact the forward struts when the carrier is in its carrying position and said rear links adapted to have their free ends contact the rear struts when the carrier is in its lowered position, said links thus forming load carrying trusses.

2. A car top carrier, consisting of: a load carrying platform adapted to be supported at its front end by an automobile body top; pairs of struts adapted to entirely support the rear end of said platform; adjustable lower ends for each of said struts; fixtures adapted to be secured to the rear bumper of an automobile and provide spaced pivots for the struts of a pair, said pivots being disposed with the pivot of the forward strut above and forward of the pivot of the rear strut; pivots for the upper ends of the struts of a pair, secured to said platform and having a greater center-to-center distance than the said pivots for the lower end of said strut; a forward link and a rear link pivoted to the upper ends of said struts and having their free ends meeting intermediate said struts of a pair; counter-balancing springs pivoted at one end to the forward strut of each pair and at their opposite ends operatively connected to the free ends of said links; said forward links adapted to have their free ends contact the forward struts when the carrier is in its carrying position and said rear links adapted to have their free ends contact the rear struts when the carrier is in its lowered positions, said links thus forming load carrying trusses.

3. A car top carrier, consisting of: a load carrying platform adapted to be supported at its front end by an automobile body top; two pairs of struts adapted to entirely support the rear end of said platform; fixtures adapted to be secured to the rear bumper of an automobile and provide spaced pivots for the struts of a pair, said pivots being disposed with the pivot of the forward strut above and forward of the rear strut; pivots for the upper ends of the struts of a pair, secured to and having a greater center-to-center distance than the said pivots for the lower end of said strut; a forward link and a rear link pivoted near the upper ends of said struts and having their free ends meeting intermediate said struts of a pair; counter-balancing springs pivoted at one end to the forward strut of each pair and at their opposite ends operatively connected to the free ends of said links; adjustable positioning means secured near the free ends of said links; said forward links adapted to have their positioning means contact the forward struts when the carrier is in its carrying position and said rear links adapted to have their positioning means contact the rear struts when the carrier is in its lowered positions, said links thus forming load carrying trusses.

4. A car top carrier, consisting of: a load carrying platform adapted to be supported at its front end by an automobile body top; pairs of struts adapted to entirely support the rear end of said platform and partially support the front end of said platform; fixtures adapted to be secured to the rear bumper of an automobile and provide spaced pivots for the struts of a pair, said pivots being disposed with the pivot of the forward strut above and forward of the pivot of the rear strut; pivots for the upper ends of the struts of a pair, secured to and substantially equi-spaced from the plane of said platform and having a greater center-to-center distance than the said pivots for the lower end of said struts; links pivoted to the upper ends of said struts and having their free ends meeting intermediate said pair of struts; and counter-balancing springs pivoted at one end to the forward strut of each pair and at their opposite ends operatively connected to the free ends of said links.

5. A car top carrier, consisting of: a load carrying platform adapted to be supported at its front end by an automobile body top; pairs of struts adapted to entirely support the rear end of said platform; fixtures adapted to be secured to the rear bumper of an automobile and provide spaced pivots for the struts of a pair, said pivots being disposed with the pivot of the forward strut above and forward of the pivot of the rear strut; pivots for the upper ends of the struts of a pair, secured to said platform and having a greater center-to-center distance than the said pivots for the lower end of said strut; links pivoted near the upper ends of said struts and having their free ends meeting intermediate said pair of struts; counter-balancing springs pivoted at one end to the forward strut of each pair and at their opposite ends operatively connected to the free ends of said links.

6. A car top carrier, consisting of: a load carrying platform adapted to be supported at its front end by an automobile body top; pairs of struts adapted to entirely support the rear end of said platform and partially support the front end of said platform; adjustable ends for each of said strut fixtures adapted to be secured to the rear bumper of an automobile and provide spaced pivots for the struts of a pair, said pivots being disposed with the pivot of the forward strut above and forward of the pivot of the rear strut; pivots for the upper ends of the struts of a pair, secured to said platform and having a greater center-to-center distance than the said pivots for the lower end of said strut; links pivoted near the upper ends of said struts and having their free ends meeting intermediate said struts of a pair; counter-balancing springs pivoted at one end to the forward strut of each pair and at their opposite ends operatively connected to the free ends of said links.

CARL E. BURKEY.

No references cited.